United States Patent [19]

Young

[11] 4,212,164
[45] Jul. 15, 1980

[54] VARIABLE DELIVERY PUMP CONTROL SYSTEM

[75] Inventor: John E. G. Young, Watertown, N.Y.

[73] Assignee: General Signal Corporation, Stamford, Conn.

[21] Appl. No.: 966,835

[22] Filed: Dec. 6, 1978

[51] Int. Cl.³ .............................................. F04B 49/00
[52] U.S. Cl. ........................................ 60/452; 60/465; 417/217; 417/218
[58] Field of Search ............... 60/445, 451, 452, 465; 417/217, 218, 219, 220, 221, 222

[56] References Cited

U.S. PATENT DOCUMENTS

| | | | |
|---|---|---|---|
| 2,896,411 | 7/1959 | Bowers et al. | 60/452 X |
| 3,127,745 | 4/1964 | Young | 60/389 |
| 3,166,891 | 1/1965 | Weisenbach | 60/389 |
| 3,669,570 | 6/1972 | Himmler | 417/222 |
| 3,946,560 | 3/1976 | MacIntosh et al. | 60/428 X |

Primary Examiner—Carlton R. Croyle
Assistant Examiner—Edward Look
Attorney, Agent, or Firm—Jeffrey S. Mednick; Harold S. Wynn

[57] ABSTRACT

A variable delivery pump has a pump control mechanism in a housing secured thereto for governing directional flow of fluid through the pump, the pump being adapted to be connected through a closed loop to a motor. A pressure compensating valve is provided in the housing for governing pressure output of the pump, and a pump control cylinder is provided for positioning a flow control cam of the pump in accordance with flow of fluid through the direction control valve and the pressure compensating valve. A cam plate is coaxially connected to a directional control rotatable valve spool of the direction control valve, the cam plate having an outer periphery that is continuously radially variable from a maximum radial point to a minimum radial point for either direction of rotation of the cam from the maximum radial point as the control spool is rotated in either direction from a normal position. The cam plate actuates a cam follower, which in turn actuates a slideable sleeve in the pressure compensating valve. A valve sleeve on the directional control valve is fixed against rotation. There is no feedback connection to the cam plate of the pump to either the direction control valve or the pressure compensating valve.

3 Claims, 5 Drawing Figures

VARIABLE DELIVERY PUMP CONTROL SYSTEM

REFERENCE TO PRIOR CASES

This invention relates to my prior U.S. Pat. No. 3,127,745 and to the prior Weisenbach U.S. Pat. No. 3,166,891, which are incorporated herein by reference for a better understanding of the background of the present invention.

BACKGROUND OF THE INVENTION

The present invention relates to variable delivery hydraulic pump control systems adapted for closed loop connection to reversible fluid motors, and it more particularly relates to pressure and flow control valve mechanisms adapted to be secured to the pumps for governing such systems.

A closed loop hydraulic system generally includes a variable delivery fluid pump which has a pump control valve mechanism in a housing secured thereto, the housing containing a directional control valve, and an override pressure responsive secondary valve for destroking the pump to override a flow designated by the extent of operation of the direction control valve in case of overload. Such a suystem is disclosed, for example, in the prior Weisenbach U.S. Pat. No. 3,166,891, granted Jan. 26, 1965 and assigned to the same assignee as the present invention. The above described mode of operation of the hydraulic system according to this patent is obtained by a feedback connection of a movable sleeve in each of the valves being positioned by feedback linkage connected to a flow control cam in the variable delivery pump. With such linkage connection, the direction control valve governs the direction and desired rate of flow of fluid in the closed loop, and the pressure responsive valve senses overload to destroke the pump as required to prevent stalling. To provide this mode of operation, a feedback cam is included in the feedback linkage, the feedback cam being designed to permit maximum pressure output of the pump at a minimum pump stroke position for utilization of full horsepower input to the system. An operator designates rate of flow but not precise pressure limits by the extent to which he operates his direction control valve lever from a normal center position.

An object of the present invention is to provide a variable delivery hydraulic pump control system which substantially obviates one or more of the limitations of the described prior art system.

Another object of the present invention is to permit an operator to designate maximum pressure for the system by the extent to which he actuates his direction control lever away from a normal position to which the lever is biased.

Another object of the present invention is to improve operating facilities of a closed loop hydraulic control system at minimum cost.

Other objects, purposes and characteristic features will be in part obvious from the accompanying drawings, and in part pointed out as the description of the invention progresses.

SUMMARY OF THE INVENTON

A variable delivery hydraulic pump control system is provided having a variable delivery pump adapted to be connected through a closed loop to a reversible motor. Secured to the pump is a pump control mechanism in a housing, the mechanism comprising a directional control valve and a pressure compensating valve for governing operation of the pump through a pump control cylinder that is connected to a stroke control cam of the pump for governing the rate of flow of fluid through the closed loop. The pump control cylinder is governed jointly by the direction control valve and the pressure compensating valve in such a manner that movement of the direction control valve away from its center position in the selected direction is effective to govern maximum pressure that can be delivered by the pump directly in accordance with the extent of actuation of the direction control valve.

This mode of operation is accomplished without feedback connection of the valves to a stroke control cam of the pump. A cam plate is coaxially connected to a direction control rotatable valve spool of the directional control valve, the cam plate having an outer periphery that is continuously radially variable from a maximum radial point to a minimum radial point for either direction of rotation of the cam from the maximum radial point. A cam follower lever is operable about a pivot at one end to actuate a reciprocating sleeve in the pressure compensating valve with its other end. The cam follower lever has a cam follower detent at an intermediate point between its ends adapted to bear upon the outer periphery of the cam plate and maintain the reciprocating sleeve in a maximum operated position in one direction of its reciprocating operation when the control valve is in a normal center position to which it is biased.

According to this system, the maximum pressure that can be developed varies directly with the displacement of the direction control valve in either direction from its normal center position. This control system can be used to advantage in systems where it is desirable for the operator to be able to control load torque, such as in the operation of winches, cranes and the like where it is desirable to control braking and accelerating torque and/or permit free swinging applications when the direction control valve is restored to its normal center position.

For a better understanding of the present invention, together with other and further objects thereof, reference is had to the following description, taken in connection with the accompanying drawings, while its scope will be pointed out in the appending claims.

IN THE DRAWINGS

Figure 1:
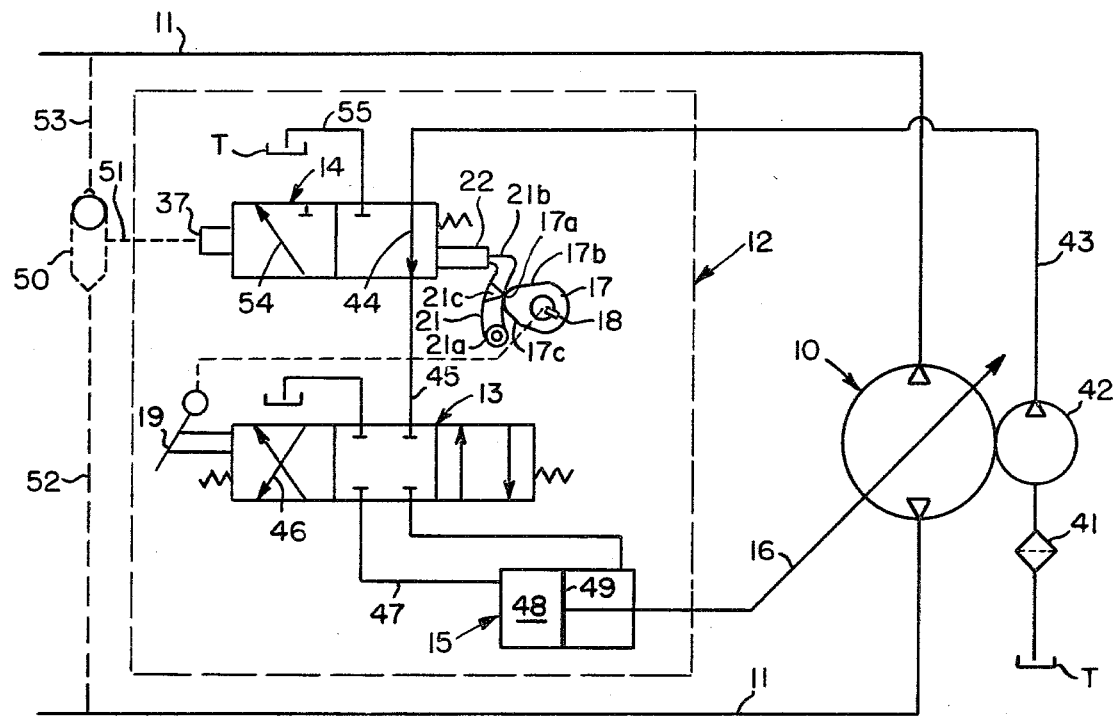
FIG. 1 is a schematic diagram of the system according to a preferred embodiment of the present invention.

With reference to FIG. 1, a variable delivery hydraulic pump control system is illustrated as comprising a variable delivery pump 10 adapted to be connected through a closed loop 11 to a reversible motor (not shown). A pump control mechanism 12 is adapted to be secured to the pump 10, the mechanism comprising a directional control valve 13 for governing directional flow of fluid through the pump 10. A pressure compensating valve 14 is provided for governing pressure output of the pump 10, and a pump control cylinder 15 is connected to a stroke control cam 16 of the pump 10.

Figure 2:
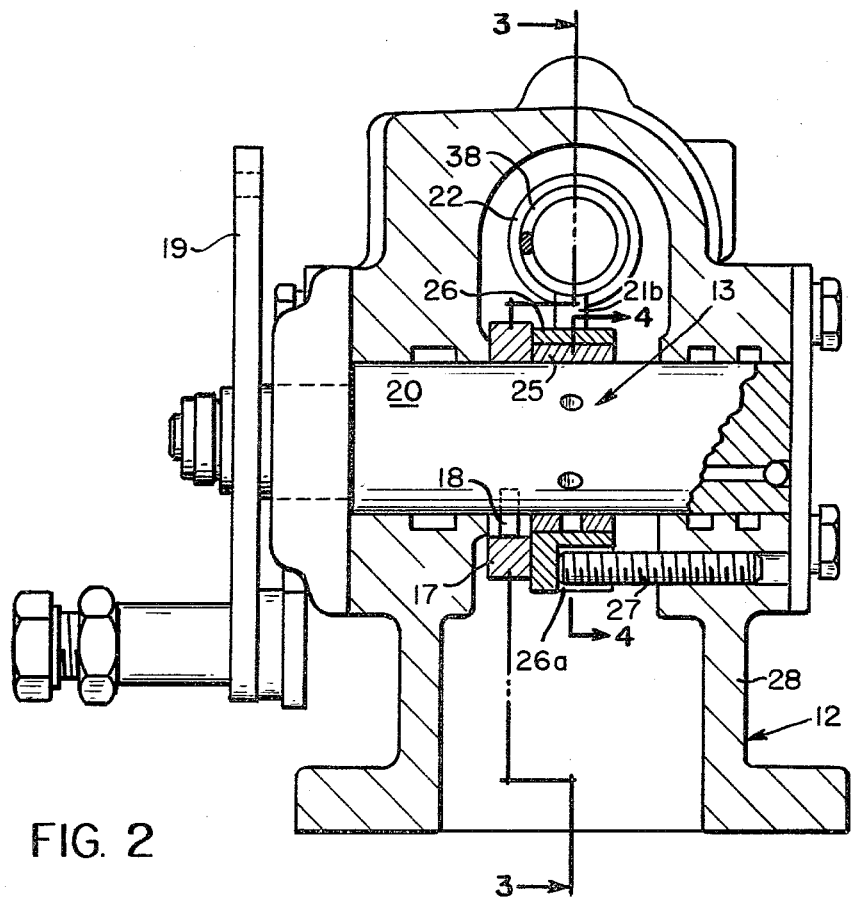
FIG. 2 is an elevational end view, partly in cross-section, of a pump control valve mechanism according to the preferred embodiment of the present invention.

A cam plate 17 is suitably connected, as with a key 18 to a direction control lever 19 and a direction control rotatable valve spool 20 (see FIG. 2). The cam plate 17 has an outer periphery continuously radially variable from a maximum radial point 17a to minimum radial points 17b and 17c on opposite sides of the point 17a for designated respective forward and reverse operating positions of the direction control lever 19. A cam follower lever 21 is pivoted at an end 21a, and is adapted to actuate a reciprocating sleeve 22 of the pressure compensating valve 14 with its other end 21b. The cam follower lever 21 has a cam follower detent 21c at an intermediate point between its ends 21a and 21b for causing actuation of the cam follower lever 21 in accordance with the cam follower detent 21c bearing on the outer periphery of the cam plate 17.

With reference to FIG. 2, the directional control valve 13 is more specifically illustrated wherein the rotatable valve spool 20 is journaled in fixed coaxial sleeves 25 and 26, the sleeve 25 being secured within the sleeve 26, and the sleeve 26 being secured along a center line below the pressure compensating valve 14. The sleeves 25 and 26 are secured against rotation by a stud 27 that is threaded into a housing 28 of the pump control mechanism 12 so that it extends into an opening 26a formed in the sleeve 26. As viewed in FIGS. 2 and 3, the cam plate 17 is secured on the spool 20 by pin 18 at a point to the left of the valve sleeves 25 and 26. With reference to FIG. 4, the sleeves 25 and 26 cooperate with the spool 20 to provide an output to the pump control cylinder 15 to actuate its piston in one direction or another in accordance with the actuation of the direction control lever 19 in one direction or another relative to its normal center position to which it is biased.

Figure 3:
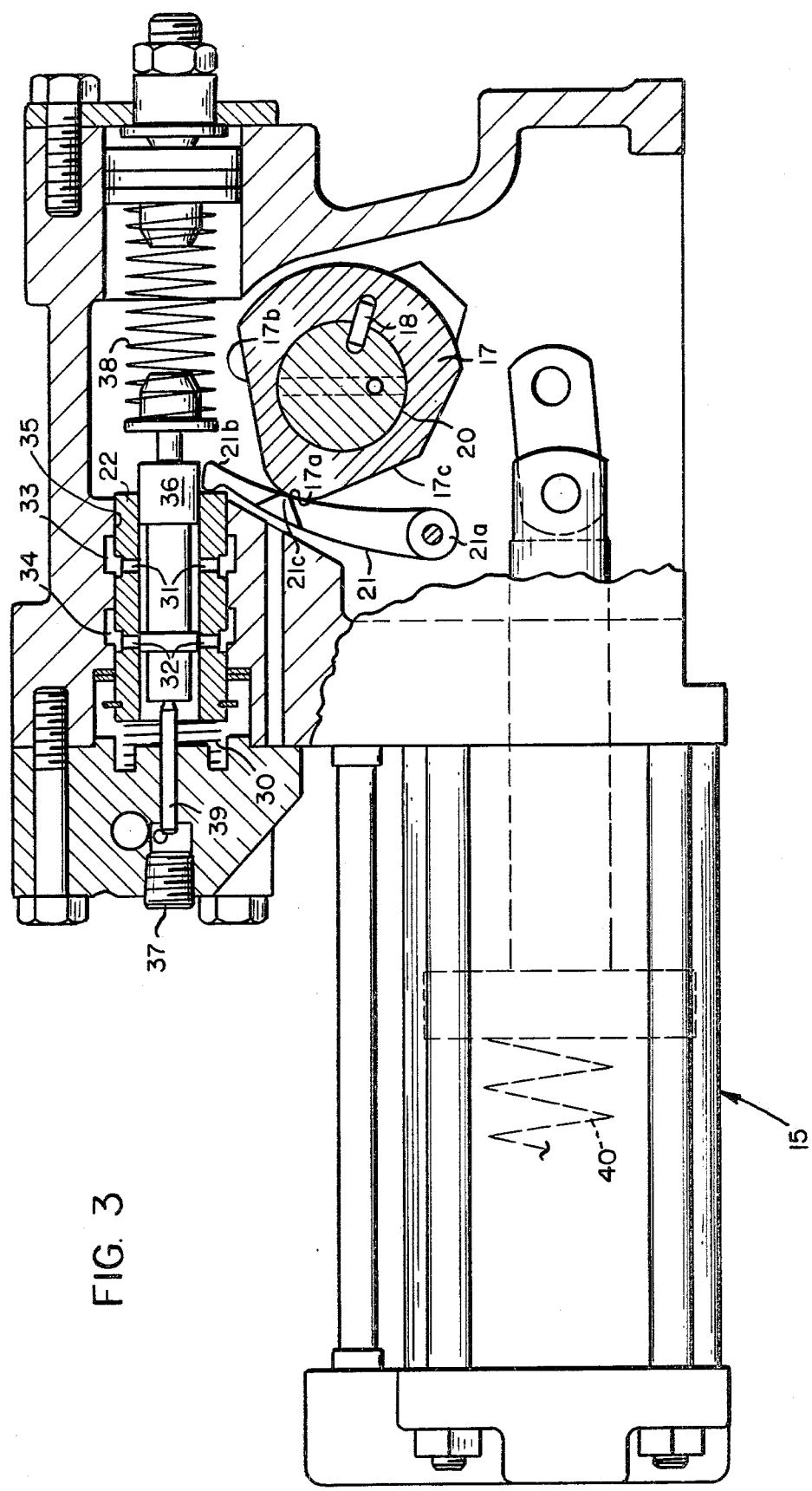
FIG. 3 is an elevational side view, partly in cross-section, of the preferred embodiment of the present invention taken along the line 3—3 of FIG. 2.
Figure 4:
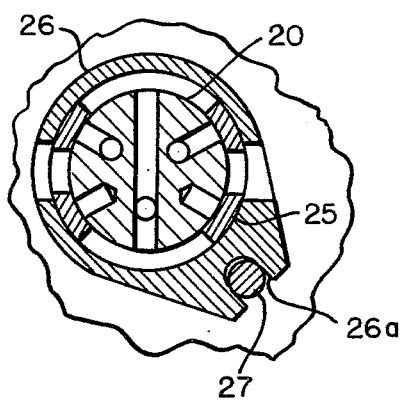
FIG. 4 is an elevational sectional view of a directional control valve taken along the line 4—4 of FIG. 2.

With reference to FIG. 3, the pressure compensating valve 14 comprises a longitudinally operable sleeve 22 biased against the end 21b of the cam lever 21 by a spring 30. The sleeve 22 has radial passages 31 and 32 cooperating with bore recesses 33 and 34 respectively formed in a bore 35 in the housing 28. A valve spool 36 is operable within the sleeve 22 in accordance with load pressure applied to a port 37 from the loop 11 (see FIG. 1). The spool 36 os longitudinally operable in accordance with pressure differences between the force of an adjustable biasing spring 38 at the right-hand end of the spool and load pressure as sensed in the loop 11 and applied to port 37 at the left-hand end. Pressure applied at port 37 is applied to spool 36 through a pin 39.

For consideration of the mode of operation of the system, reference is made to FIG. 1, wherein the apparatus is illustrated as being in its normal position. The normal position provides that the direction control lever 19 is biased to its center position, which carries the cam 17 to the position illustrated wherein it actuates the sleeve 22 to its furthermost left-hand position. This means that the pressure compensating valve 14 can be operated by a relatively low pressure in the loop 11 to a position venting a selected chamber of the control cylinder 15 to atmosphere for permitting relatively free flow of fluid in the loop 11 at low pressure. A spring 40 in the left-hand section of the control cylinder 15 biases the cam 16 of the pump 10 to a center position, and thus provides a stabilization effect on the pump cam 16 at times of low pressure in the loop 11.

Figure 5:
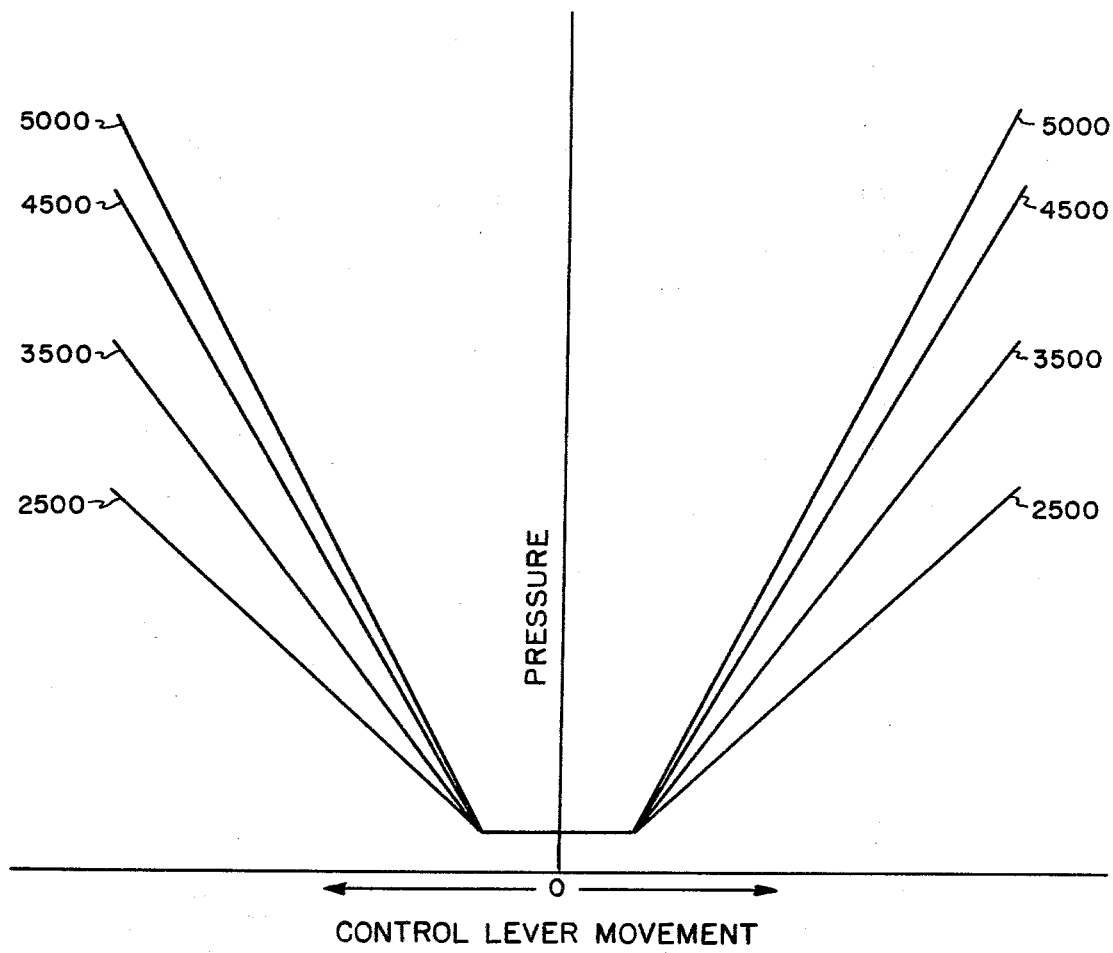
FIG. 5 is a curve illustrating typical maximum pressure values that can be selected as the direction control valve of FIG. 2 is rotated in either direction relative to its normal position.

If it is assumed that an operator actuates the lever 19 to rotate the direction control spool 20 and the cam plate 17 in a selected direction, pressure is permitted to build up in the loop 11 in the selected direction to an extent in accordance with the number of degrees of rotation of the spool 20, as is illustrated in FIG. 5. As compared to hydraulic systems having feedback linkage connected from the pump back to a sleeve of the direction control valve 13 and to a sleeve of the pressure compensting valve 14, as in the prior art, the stroke of the pump 10 is permitted to be increased as long as the pressure in the loop 11 is below a cut-off point of the pressure compensating valve 14 as is determined by the rotated position of the direction control valve (see FIG. 5). This means that the stroke of the pump 10 increases, for a particular direction designation, for example, by flow of fluid from a tank T through a suitable filter 41, a charge pump 42, passage 43, and open passage 44 of pressure compensating valve 14, passage 45, passage 46 of direction control valve 13 and passage 47 to a chamber 48 to the left of piston 49 in the control cylinder 15. The highest pressure developed in either of the loop passages 11 is selected by a suitable shuttle valve 50 so that the port 37 of the pressure compensating valve 11 is selectively connected by pilot passage 51 and passage 52 or 53 to the high pressure side of loop 11. This arrangement permits pressure to be built up in the output of the pump 10 only until pressure applied at the port 37 is sufficient to shift the valve 14 to the right for connecting passage 45 to tank T through passages 54 and 55. This destrokes pump 10 sufficiently to maintain its pressure output below the maximum pressure designated by the degree of rotation of the direction control valve 13. Direction control lever 19 can have its degree of rotation adjusted as desired to limit the maximum pressure that can be developed in the system.

It will be apparent that a similar mode of operation is obtained when the direction control valve 13 is operated in its opposite direction for designation of the other direction of flow of fluid in the loop 11.

The curves of FIG. 5 are different maximum pressure characteristic curves that can be obtained by choice of different diameter pins 39 and/or different pressure springs 38. The curve 2500, for example, shows that, with one choice of pin and spring sizes, maximum pressure that can be developed in the system varies directly with the extent of rotaton of the direction control valve 13 in either direction from its center position. The maximum pressure that can be developed according to this curve is 2500 pounds at full 30° rotation of direction control valve 13.

Having thus described a variable delivery pump control system having an improved pump control mechanism for providing selected compensator control of a pump as a preferred embodiment of the present invention, it is to be understood that various modifications and alterations may be made to the specific embodiment shown without departing from the spirit or scope of the invention.

What is claimed is:

1. A variable delivery hydraulic pump control system comprising a variable delivery pump adapted to be connected through a closed loop to a reversible motor, and a pump control mechanism in a housing adapted to be secured to the pump, the mechanism comprising direction control valve means for governing directional flow of fluid through the pump, a pressure compensating valve means for governing pressure output of the pump, and pump control cylinder means connected to a stroke control cam of the pump for governing the rate of flow of fluid through the closed loop, the pump control cylinder means being governed jointly by the direction control valve means and the pressure compensating valve means, wherein improved maximum pressure regulating means in the pump control mechanism housing comprises:

(a) a cam plate coaxially connected to a directional control rotatable valve spool of the directional control valve means, the cam plate having an outer periphery that is continously radially variable from a maximum radial point to a minimum radial point for either direction of rotation of the cam from the maximum radial point, and (b) a cam follower lever operable about a pivot at one end to actuate a reciprocating sleeve in the pressure compensating valve means with its other end, (c) the cam follower lever having a cam follower detent at an intermediate point between its ends adapted to bear upon the periphery of the cam plate and maintain the reciprocating sleeve in a maximum operated position in one direction of its reciprocating operation when the control valve means is in a center position, (d) whereby, upon actuation of the direction control valve means from a normal position for designation of operation of a motor in either direction, maximum flow is permitted in the closed loop except as limited by the positioning of the reciprocating sleeve of the pressure compensating valve means.

2. A variable delivery hydraulic pump control system according to claim 1 wherein the directional control valve means comprises:

(a) a directional control valve sleeve disposed adjoining the cam plate on the direction control valve spool having passages formed therein for cooperating with the directional control valve sleeve to govern flow of fluid in one direction or another to the pump control cylinder means as the direction control spool is rotated in one direction or another from a normal center position, and (b) the direction control valve sleeve being secured to the housing to prevent rotation and the cam plate being keyed to the direction control spool to rotate therewith.

3. A variable delivery hydraulic pump control system according to claim 2 wherein the cam plate lever has a longitudinal center line extending downwardly from one end of the reciprocating sleeve and the cam follower detent is off center relative to the center line of the cam plate lever to cooperate with the outer periphery of the cam plate.

* * * * *